United States Patent Office 3,282,284
Patented Nov. 1, 1966

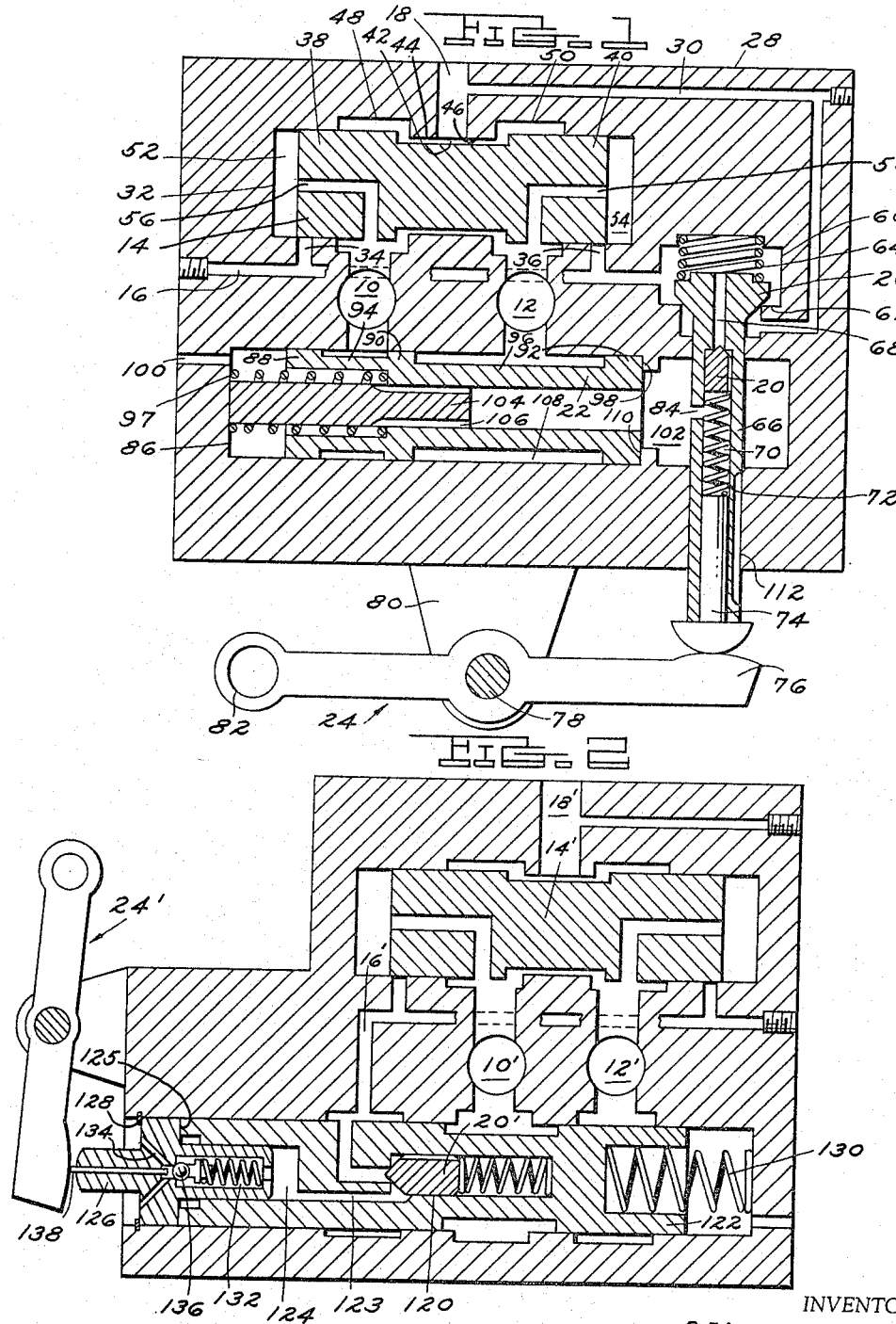

3,282,284
FLUID PRESSURE CONTROL VALVING
Dennis Harris, Birmingham, John Rankin, Warwickshire, and Jan Szambir, Birmingham, England, assignors to Ford Motor Company, Dearborn, Mich., a corporation of Delaware
Filed Mar. 18, 1963, Ser. No. 265,730
Claims priority, application Great Britain, Mar. 19, 1962, 10,347/62
14 Claims. (Cl. 137—110)

This invention relates to a fluid pressure control mechanism and, more particularly to one providing a single control for a plurality of alternating high and low pressure fluid sources. The control maintains whichever of the sources is at the highest and lowest pressures connected to a high and low pressure service lines, respectively. It also provides system overload relief means, coupled with additional control means to automatically bypass the fluid outputs of the several sources to each other to render the control inoperable; and a manual reset apparatus to again condition the system for operation. It further includes operator controlled means to connect the sources for a fluid bypass condition.

This invention has particular application, although it is not limited to, a hydrostatic type of transmission having fluid connected variable displacement swash plate type pumps and motors, whether it be for use in a motor vehicle or other installation. In an installation of this type, the pump and motor alternate as high and low pressure fluid sources, and their fluid outputs are also generally utilized to actuate other components of the system, such as the pump and/or motor displacement servo means, relief valves and gauges. However, duplication of lines and valving often results unless suitable controls are available to combine these varying outputs. Also, relief valves are generally provided to prevent an overload in the system; however, too premature or recurrent resetting of the relief valve means can cause shock loads to the system, which are undesirable. Therefore, some means must be provided to prevent the resetting of the relief valves until conditions are proper. Also, in cases where the hydrostatic transmission is used in a motor vehicle installation, for example, it is often desired to provide some means for placing the transmission in neutral to provide a start of a stalled engine without causing rotation of the power output shaft, or to provide a tow of the vehicle. It is also frequently desirable to provide a gradual start of a vehicle by an inching process.

The invention accomplishes the above objectives by providing a single, compact control mechanism that selectively controls the variable outputs of a number of alternating high and low pressure fluid sources to maintain a constant supply of high and low pressure fluids. The invention also provides system overload relief means, operable automatically in conjunction with a fluid source bypass control to render the fluid distributor control ineffective until the system is reset by the vehicle operator. The mechanism further includes a manually operable overcontrol for establishing a fluid bypass condition at any time.

Therefore, it is an object of the invention to provide a fluid pressure control for establishing constant supplies of high and low pressure fluids from a plurality of alternating high and low pressure fluid sources.

It is also an object of the invention to provide a fluid control automatically operable to prevent overload in the system, and to provide operator controlled means to prevent untimely subsequent reset of the control to an operable condition.

It is a still further object of the invention to provide operator controlled means to create a bypass condition of the fluid outputs of the sources to terminate a drive from a pump to a motor, for example.

It is a still further object of the invention to provide a hydrostatic transmission fluid control, normally automatically providing constant supplies of high and low pressure fluids from a number of variable pressure sources, with automatically operating and/or operator actuated fluid bypass establishing means, which, once operated, must be reset by the operator.

Other objects, features and advantages of the invention will become apparent upon reference to the succeeding detailed description thereof, and to the drawings illustrating the preferred embodiments thereof.

FIGURE 1 is a cross-sectional schematic illustration of a control valving embodying the invention; and, FIGURE 2 is a modification of the control valving of FIGURE 1.

In general, FIGURE 1 shows a valve body having two main fluid inlet lines 10 and 12 supplied with fluid from a variable displacement pump and motor, respectively, of the hydrostatic type, not shown. The operation of such a pump and motor combination is well known, the pump and motor alternating as high and low pressure sources of fluid. The outputs from lines 10 and 12 are controlled by a shuttle valve 14 common to both and sensitive to the pressure differential between the two to always connect the fluid having the highest pressure to a high pressure supply line 16, while connecting the lower pressure fluid to a low pressure supply line 18. A pressure relief valve 20 prevents an overload in the high pressure line, and, when unseated, effects movement of a control neutralizing valve 22 to connect the main lines 10 and 12 for a bypass of their outputs. This bypass condition remains in effect until actuation of an operator controlled lever 24 to effect a return of the valve 22 to a position permitting the shuttle valve to again be effective. The lever 24 also operates a poppet type valve 26 to interconnect the high and low pressure lines at any time to establish the bypass condition in another way irrespective of the operation of the pressure relief and neutralizing valve means.

More specifically, FIGURE 1 shows a valve body 28 having the two main fluid pressure inlet lines 10 and 12 each alternatingly providing a high and low pressure level of fluid therein. Line 10, for example, contains the variable output from a variable displacement pump of the axial sliding piston and swash plate type, for example, and line 12, the output from a similar type motor fluid driven by the pump. In such an installation, the pump and motor each have a pressurizing cycle and an intake or suction cycle, the high pressure cycle of the pump being concurrent with the low pressure cycle of the motor, and vice versa, in a known manner. Thus, at the time line 10 is supplying fluid at a high pressure, the fluid in line 12 is at a low pressure, and vice versa.

The high and low pressure fluid discharged from both lines are adapted to be connected, respectively, to the high pressure supply line 16 and the low pressure line 18 by means of the shuttle valve 14. The high pressure line may lead, for example, to servos for adjusting the angles of the pump and/or motor swash plates, or to other fluid pressure operated control devices (not shown). The low pressure line may be connected to a low pressure make-up pump or accumulator for the fluid system, for example, and has a branch or take-off pressure passage 30 for actuating a number of low pressure operated devices.

Shuttle valve 14 is slidably received in an annular bore 32 in the valve body, the bore connecting the low pressure line 18 to the high pressure line 16 by intersecting bores 34 and 36. The valve is of the spool type having end lands 38 and 40 of equal size connected by a neck portion 42 of reduced diameter. The neck portion cooperates with an annular boss 44 on the valve body to provide an annular flow restricting passage 46 therebetween. The bore 32 has increased diameter annuli 48 and 50 in communication with the fluid inlet lines 10 and 12 at all times. The shuttle valve has a seal fit with opposite ends of the bore 32 to provide fluid chambers 52 and 54 therebetween that are connected at all times to the fluid inlet lines 10 and 12 through passages 56 and 58 in the valve lands.

Shuttle valve 14 is shown in a neutral or median position blocking flow from the inlet lines to the high pressure line 16, while connecting both fluids to the low pressure line 18. Assume now that the hydrostatic transmission is operating to provide a high pressure fluid output in line 10 and a low pressure in line 12. Because of the restrictive orifice 46, the pressure in chamber 52 will immediately rise in comparison to the pressure in chamber 54, resulting in a rightward movement of the shuttle valve to connect inlet line 10 to the high pressure line 16 through valve passage 56 and branch line 34. The low pressure inlet line 12 and chamber 54 remain connected to the low pressure line 18. As soon as the cycle changes, that is, inlet line 10 becomes the low pressure line and line 12 becomes the high pressure line, the resultant decay in pressure in chamber 52 and rise in pressure in chamber 54 causes a leftward movement of the valve to connect line 12 to the high pressure line 16 through bore 36, and line 10 to the low pressure line 18. Thus, regardless of which of the inlet lines 10 or 12 contains the highest pressure fluid at the particular moment, shuttle valve 14 will automatically connect the fluid at the highest pressure to line 16 while connecting the lower pressure line to the line 18.

Means are provided for manually short circuiting the system at will, if desired, and/or automatically preventing an overload in the system. More specifically, both the high and low pressure lines 16 and 18 are connected to opposite ends of a bore 60 in the valve body provided with a seat 62 for a slidable poppet type valve 26. The valve is normally held against the seat by a spring 64 to block communication between the high and low pressure lines. The poppet valve has a hollow stem 66 and a central passage 68 connecting the interior 70 of the stem to bore 60. The shouldered junction between the passage and chamber 70 serves as a seat for a pressure relief valve 20. Valve 20 is seated by a spring 72 to close passage 68 below a predetermined pressure in line 16. A preload on the spring is provided by the stem of a button type plunger 74 held thereagainst by one end 76 of the operator controlled lever 24. The lever has a central pivot 78 fixed to a support 80 extending from the valve body, and is moved by swinging end 82.

Chamber 70 in the poppet valve stem has a fluid outlet port 84 to permit the escape of fluid from the high pressure line 16 into a bore 86 in the valve body when the pressure relief valve 20 unseats. The bore slidably receives the fluid bypass control valve 22, which is of the spool type having a number of lands 88, 90 and 92 connected by neck portions 94 and 96 of reduced diameter. The valve is normally biased against a shoulder 98 on the valve body by a spring 97, this position blocking communication between main lines 10 and 12. The bore 86 is vented through a passage 100 at one end, the exhaust of fluid from the opposite end 102 of the bore being controlled by an annular bleed member 104 fixed to the valve body. The bleed member has a number of circumferentially spaced longitudinal grooves 106 constituting fluid restrictions or orifices between the valve 22 and the bleed member. Fluid is permitted to escape slowly from the bore end 102 when the valve is in the position shown to prevent a pressure buildup against this end of the valve. The orifices are of a size so as to be incapable of handling the total volume of fluid vented through port 84 when the pressure relief valve 20 unseats, so that pressure builds up against the end 110 of valve 22. The valve will then move against the force of spring 97 to block off the discharge through orifices 106 and connect inlet lines 10 and 12 through the annular chamber 108 defined between lands 90 and 92. Thus, a fluid bypass condition is established resulting in a drop in pressure in line 16 to that in line 18. This drop in pressure also causes the pressure relief valve to reseat, thereby shutting off any escape route for the fluid in bore 86 and, therefore, preventing the return movement of valve 22 to its normal position. Thus, the control remains in a fluid bypass condition.

This bypass condition is terminated by counterclockwise movement of lever 24 forcing the poppet valve stem 66 upwardly to vent chamber 102 through a radial groove 112 provided for this purpose in the stem. Simultaneously, the poppet valve 26 unseats to provide direct communication between low and high pressure lines 16 and 18. As soon as chamber 102 is vented, therefore, valve 22 moves to the right against shoulder 98 due to the force of spring 97, thereby opening the restrictive orifices 106 to exhaust any fluid remaining in bore 86. This movement therefore disconnects lines 10 and 12, and the control is again conditioned for operation upon reseating of the poppet valve by release of lever 24. The shuttle valve 14 is thus again effective to automatically supply the highest and lowest pressure fluids to the high and low pressure lines 16 and 18.

It will be clear from the above, that the system can also be conditioned for a bypass operation at any time, simply by actuating lever 24 to lift poppet valve 26 off its seat and interconnect the high and inner pressure lines 16 and 18 through bore 60 and branch line 30.

FIGURE 2 shows a modified construction. The shuttle valve 14', fluid inlet lines 10' and 12', and the high and low pressure lines 16' and 18' are substantially identical in construction and operation to the corresponding parts in FIGURE 1, and their details will therefore not be repeated.

In FIGURE 2, the high pressure line 16' is again controlled by a spring loaded relief valve 20', which, in this case, however, is movable in a central bore 120 in the system bypass control valve 122. The bore 120 is connected by a passage 123 to an enlarged bore 124 in the open end 125 of the valve, which is closed by a slidably movable pintle 126. Valve 122 normally sealingly seats the pintle against a snap ring 128 by means of a spring 130 acting on the opposite end of the valve. The pintle has an internal bore 132 open at one end to bore 124 and vented at its opposite end through passages 134.

A spring seated ball check valve 136 normally blocks fluid flow from bore 124 to exhaust passages 134, the valve being unseated by the rightward movement of an actuating pin 138.

In operation, the parts are initially positioned as shown with no fluid under pressure being present in bore 124. The alternate supply of high and low pressure fluid from supply lines 10' and 12' moves shuttle valve 14' to the right or left, as required, to deliver the high and low pressure fluids into lines 16' and 18'. When the pressure in line 16' has reached an amount sufficient to unseat the pressure relief valve 20', it moves to the right to admit fluid to the passage 123 and bore 124. Check valve 136 being seated, fluid under pressure acts against the face 125 of valve 122 to move the valve to the right against the force of spring 130 and interconnect the fluid inlet lines 10' and 12' for a bypass condition, thereby dropping the pressure in line 16'. The pressure relief valve 20' will then reseat, thereby locking valve 122 in the bypass position due to the trapping of the fluid in bore 124. This condition remains until lever 24' is swung counterclockwise, actuating pin 138 to unseat ball valve 136 and thereby vent bore 124 through passages 134. Spring 130 then moves valve 122 to the left to the position shown disconnecting lines 10' and 12' and rendering the control again operable in a normal manner upon seating of the check valve 136. The fluid bypass condition of operation may also be established at any time, regardless of the pressure in line 16', by actuation of lever 24' to move pintle 126 and valve 122 bodily against the force of spring 130 to connect inlet lines 10' and 12' for a fluid bypass condition.

From the foregoing, therefore, it will be clear that the invention provides a fluid pressure control system normally providing continuous supplies of high and low pressure fluids from a plurality of alternating high and low pressure fluid sources regardless of which of the sources is at the highest pressure at any particular time. It will also be seen that the invention provides automatic overload control means that establishes a fluid bypass condition until reset for operation by the operator, and that the invention also provides selectively operable means for establishing the fluid bypass condition at any time regardless of whether or not an overload exists.

It will also be seen that the invention provides a control for a hydrostatic transmission for a motor vehicle, for example, to permit the starting of a stalled engine, or a tow start, without necessitating a change in the displacement of the pump and motor, simply by the selective positioning of the control mechanism for varying degrees of fluid bypass of the outputs of the fluid sources. This positioning also permits a gradual or progressive start of a motor vehicle.

While the invention has been shown in its preferred embodiments, it will be clear to those skilled in the arts to which the invention pertains, that it would have use in many installations other than that described wherever a control of this type is desired, and that many changes and modifications may be made thereto without departing from the scope of the invention.

We claim:

1. Fluid pressure control means comprising, in combination, a plurality of alternating high and low pressure fluid sources, high and low pressure fluid lines, and conduit means connecting the fluid from said sources to said fluid lines, selective means in said conduit means connecting the highest pressured fluid source to said high pressure line and the remaining of said fluid sources to said low pressure line, other means operable at times to connect said sources to each other and maintain said sources connected, and selectively operable means to disconnect said sources from each other to restore the highest pressured fluid to said high pressure line.

2. Fluid pressure control means comprising, in combination, a plurality of alternating high and low pressure fluid sources, high and low pressure fluid lines, and conduit means connecting the fluid from said sources to said fluid lines, selective means in said conduit means connecting the highest pressured fluid source to said high pressure line and the remaining of said fluid sources to said low pressure line, other means automatically operable at times to connect said sources to each other and maintain said sources connected, and manual means to effect a disconnection of said sources from each other to restore the highest pressured fluid to said high pressure line.

3. Fluid pressure control means comprising, in combination, a plurality of alternating high and low pressure fluid sources, high and low pressure fluid lines, and conduit means connecting the fluid from said sources to said fluid lines, selective means in said conduit means connecting the highest pressured fluid source to said high pressure line and the remaining of said fluid sources to said low pressure line, and manual and automatically operable means to connect said sources to each other and maintain said sources connected, said manual means also being operable to effect a disconnection of said sources from each other to restore the highest pressured fluid to said high pressure line.

4. Fluid pressure control means comprising, in combination, a plurality of alternating high and low pressure fluid sources, high and low pressure fluid lines, and conduit means connecting the fluid from said sources to said fluid lines, selective means in said conduit means connecting the highest pressurized fluid source to said high pressure line and the remaining of said fluid sources to said low pressure line, other means automatically operable above a predetermined pressure in one of said lines to connect said sources to each other and maintain said sources connected, and manual means operable to effect a disconnection of said sources from each other to restore the highest pressured fluid to said high pressure line.

5. Fluid pressure control means comprising, in combination, a plurality of alternating high and low pressure fluid sources, high and low pressure fluid lines, and conduit means connecting the fluid from said sources to said fluid lines, selective means in said conduit means connecting the highest pressured fluid source to said high pressure line and the remaining of said fluid sources to said low pressure line, pressure relief means automatically operable above a predetermined pressure in one of said lines to vent fluid therefrom, other means between said sources movable in response to movement of said pressure relief means to connect said sources to each other and maintain said sources connected, and manual means operable to effect a disconnection of said sources from each other to restore the highest pressured fluid to said high pressure line.

6. Fluid pressure control means comprising, in combination, a plurality of alternating high and low pressure fluid sources, high and low pressure fluid lines, and conduit means connecting the fluid from said sources to said fluid lines, first means in said conduit means alternately connecting the highest pressured fluid source to said high pressure line and connecting the remaining of said fluid sources to said low pressure line, fluid pressure relief valve means automatically operable above a predetermined pressure in said high pressure line to vent fluid therefrom, said conduit means including a fluid line connecting said sources, a valve in said line normally blocking said connection, said valve being moved by the fluid vented by said pressure relief valve means to a position connecting said sources to each other, and manual means operable to effect a disconnection of said sources from each other to restore the highest pressured fluid to said high pressure line.

7. Fluid pressure control means comprising, in combination, a plurality of alternating high and low pressure fluid sources, high and low pressure fluid lines, and conduit means connecting the fluid from said sources to said fluid lines, first means in said conduit means alternately connecting the highest pressured fluid source to said high pressure line and connecting the remaining of said fluid sources to said low pressure line, fluid pressure relief valve means automatically operable above a predetermined pressure in said high pressure line to vent fluid therefrom, said conduit means including a fluid line connecting said sources, a valve in said line normally blocking said connection, said valve being moved by the fluid vented by said pressure relief valve means to a position connecting said sources to each other, and manual means operably connected to said valve and valve means and operable to terminate the movement of said valve by the vented fluid to effect a restoration of said valve to its normal position to restore the highest pressured fluid to said high pressure line.

8. Fluid pressure control means comprising, in combination, a plurality of alternating high and low pressure fluid sources, high and low pressure fluid lines, and conduit means connecting the fluid from said sources to said fluid lines, first means in said conduit means continuously sensitive to the pressure differential between said sources to connect the highest pressured fluid source to said high pressure line and connect the remaining of said fluid sources to said low pressure line, fluid pressure relief valve means automatically operable above a predetermined pressure in said high pressure line to vent fluid therefrom, said conduit means including a fluid line connecting said sources, a valve in said line normally blocking said connection, said valve being moved by the fluid vented by said pressure relief valve means to a position connecting said sources to each other, and manual means operably connected to said valve and valve means and operable to terminate the movement of said valve by the vented fluid to effect a restoration of said valve to its normal position to restore the highest pressured fluid to said high pressure line.

9. Fluid pressure control valving comprising, in combination, first and second alternating high and low pressure fluid sources, high and low pressure fluid lines, and conduit means connecting the fluid from said sources to said fluid lines, shuttle valve means in said conduit means movable in opposite directions by the differential in pressures of the fluids from said first and second sources acting on opposite ends thereof to connect the highest pressured fluid source to said high pressure line and the other fluid source to said low pressure line, other valve means operable at times to connect said sources to each other and maintain said sources connected, and selectively operable means to effect a disconnection of said sources from each other to restore the highest pressured fluid to said high pressure line.

10. Fluid pressure control valving comprising, in combination, first and second alternating high and low pressure fluid sources, high and low pressure fluid lines, and conduit means connecting the fluid from said sources to said fluid lines, shuttle valve means in said conduit means movable in opposite directions by the differential in pressures of the fluids from said first and second sources acting on opposite ends thereof to connect the highest pressured fluid source to said high pressure line and the other fluid source to said low pressure line, other valve means including pressure relief valve means in said high pressure line operable at times to effect a connection of said sources to each other and a maintaining of said sources connected, and selectively operable means to effect a disconnection of said sources from each other to restore the highest pressured fluid to said high pressure line.

11. Fluid pressure control valving comprising, in combination, first and second alternating high and low pressure fluid sources, high and low pressure fluid lines, and conduit means connecting the fluid from said sources to said fluid lines, shuttle valve means in said conduit means movable in opposite directions by the differential in pressures of the fluids from said first and second sources acting on opposite ends thereof to connect the highest pressured fluid source to said high pressure line and the other fluid source to said low pressure line, pressure relief valve means in said high pressure line responsive to a predetermined pressure therein to vent fluid therefrom, said conduit means including a fluid line connecting said sources, other valve means in said fluid line normally biased to a position blocking communication between said sources and movable by the fluid vented by said relief valve means to a position connecting said sources to each other, and manually operable means to direct the vented fluid away from said other valve means to effect a disconnection of said sources from each other to restore the highest pressured fluid to said high pressure line.

12. Fluid pressure control valving comprising, in combination, first and second alternating high and low pressure fluid sources, high and low pressure fluid lines, and conduit means connecting the fluid from said sources to said fluid lines, shuttle valve means in said conduit means movable in opposite directions by the differential in pressures of the fluids from said first and second sources acting on opposite ends thereof to connect the highest pressured fluid source to said high pressure line and the other fluid source to said low pressure line, pressure relief valve means in said high pressure line responsive to a predetermined pressure therein to vent fluid therefrom, said conduit means including a fluid line connecting said sources, other valve means in said fluid line normally biased to a position blocking communication between said sources and movable by the fluid vented by said relief valve means to a position connecting said sources to each other, and manually operable means to direct the vented fluid away from said other valve means to effect a disconnection of said sources from each other to restore the highest pressured fluid to said high pressure line, said manual means being operable also to connect said low and high pressure lines to each other rendering ineffective said relief and other valve means.

13. Control valving for use in a hydrostatic transmission having a reversible variable displacement pump and a motor providing alternating high and low pressure fluid sources, high and low pressure fluid lines, and conduit means connecting the fluid from said sources to said fluid lines, a shuttle valve in said conduit means sensitive to the pressure differential between said sources for connecting the highest pressured fluid source to said high pressure line and the other fluid source to said low pressure line, pressure relief valve means in said high pressure line operable above a predetermined pressure therein, other valve means associated with both of said sources and operable in response to operation of said pressure relief means to connect said sources to each other and maintain said sources connected, and manually operable means to effect a disconnection of said sources from each other to restore the highest pressured fluid to said high pressure line.

14. A fluid pressure control system comprising, in combination, a plurality of sources of fluid each under a varying pressure, high and low pressure fluid lines, conduit means connecting the fluid from said sources to said fluid lines, fluid pressure distributor valve means in said conduit means movable in response to the force of said fluids thereon from a neutral position connecting said sources to said low pressure line to positions connecting the highest pressured of said fluids to said high pressure line, pressure relief means in said conduit means operable in response to the attainment of a predetermined pressure in said high pressure line to effect a connection of the said sources of fluid to each other to equalize said pressures, and manual reset means operable to reset said system for operation to restore a high pressure in said high pressure line by effecting a disconnection of the fluid sources from each other.

References Cited by the Examiner
UNITED STATES PATENTS

| | | | |
|---|---|---|---|
| 2,354,791 | 8/1944 | Boldt | 137—112 |
| 2,811,979 | 11/1957 | Presnell | 137—112 |
| 2,937,656 | 5/1960 | Evans et al. | 137—110 |
| 3,073,332 | 1/1963 | Strader | 137—112 |

M. CARY NELSON, *Primary Examiner.*

HENRY T. KLINKSIEK, *Examiner.*